May 7, 1968 J. M. BAILEY 3,381,615
DRIVING AND TIMING MECHANISM FOR FUEL INJECTON PUMP
Filed Dec. 9, 1966 3 Sheets-Sheet 1

INVENTOR.
JOHN M. BAILEY
BY Fryer, Tjensvold, Feix & Phillips
ATTORNEYS

INVENTOR.
JOHN M. BAILEY

ATTORNEYS

May 7, 1968  J. M. BAILEY  3,381,615
DRIVING AND TIMING MECHANISM FOR FUEL INJECTON PUMP
Filed Dec. 9, 1966  3 Sheets-Sheet 3
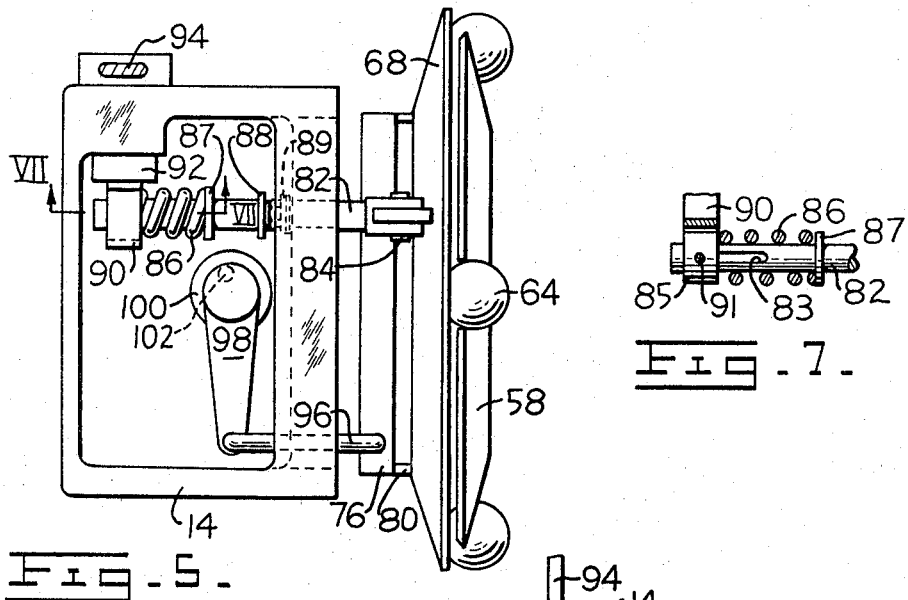
Fig. 5.
Fig. 7.
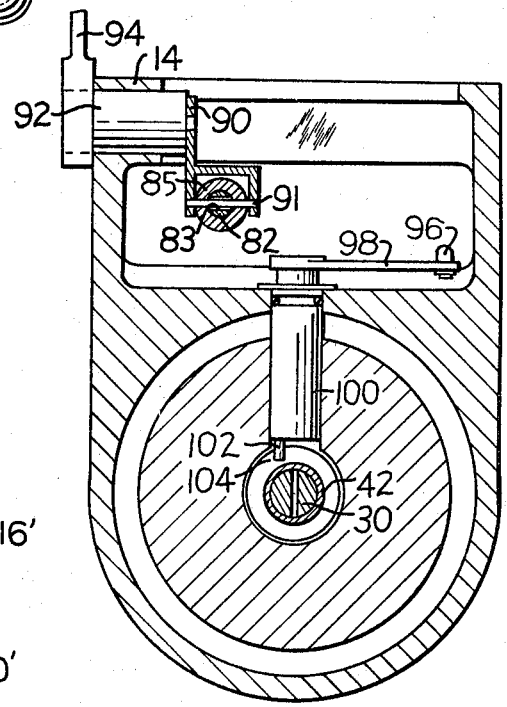
Fig. 6.
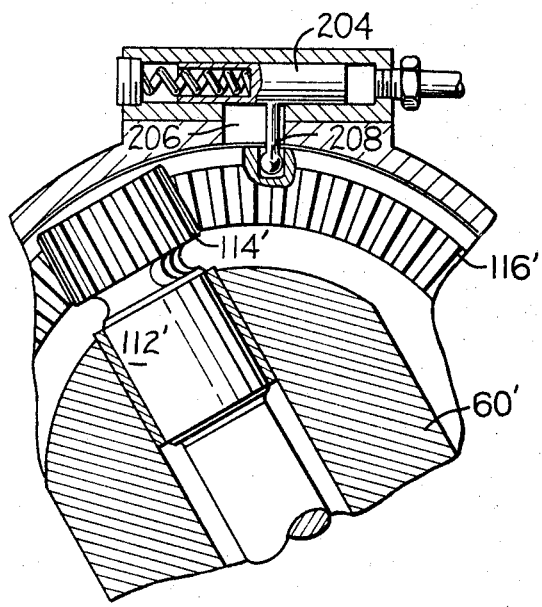
Fig. 8.
INVENTOR.
JOHN M. BAILEY
BY *Fryer, Tjensvold, Feix & Phillips*
ATTORNEYS

United States Patent Office 3,381,615
Patented May 7, 1968

3,381,615
DRIVING AND TIMING MECHANISM
FOR FUEL INJECTION PUMP
John M. Bailey, East Peoria, Ill., assignor to Caterpillar Tractor Co., Peoria, Ill., a corporation of California
Filed Dec. 9, 1966, Ser. No. 600,450
3 Claims. (Cl. 103—2)

This invention relates to fuel injection apparatus for internal combustion engines and has particular reference to a new and improved form of driving and timing mechanism therefor.

An object of the invention is to provide a simplified form of drive mechanism in which all of the main rotating members of the pump may be driven directly off of the drive shaft without resorting to extensive couplings which complicate the problem of providing proper timing.

Another object of the invention is to provide a new and improved fuel injection pump having variable timing means whereby the timing of the injection by the pump may be varied during pump operation.

A further object is to provide an apparatus of the type set forth wherein the means for varying the timing of injection is embodied in the pump and does not require any external timing device.

Another object is to provide a distributor pump having a new and improved drive means for imparting simultaneous reciprocation and rotation to a pumping and distributing member.

Yet another object of the invention is to provide a novel centrifugal force governing mechanism for a fuel injection pump.

Another object is to provide a new and improved device of the type set forth which is relatively compact and simple in construction and assembly, yet efficient in operation.

Other objects and advantages of the invention will be apparent from the following description taken in connection with the accompanying drawings. It will be understood that many changes may be made in the details of construction and arrangement of parts without departing from the scope of the invention as set forth in the accompanying claims, as the preferred form of the invention has been shown and described by way of illustration only.

In the drawings:

FIG. 5 is a view, partially in section, taken on the line V—V of FIG. 1;

FIG. 6 is a sectional view taken on the line VI—VI of FIG. 1;

FIG. 7 is a sectional view taken on the line VII—VII of FIG. 5; and

FIG. 8 is a sectional view showing a modified embodiment of the invention.

Figure 1:
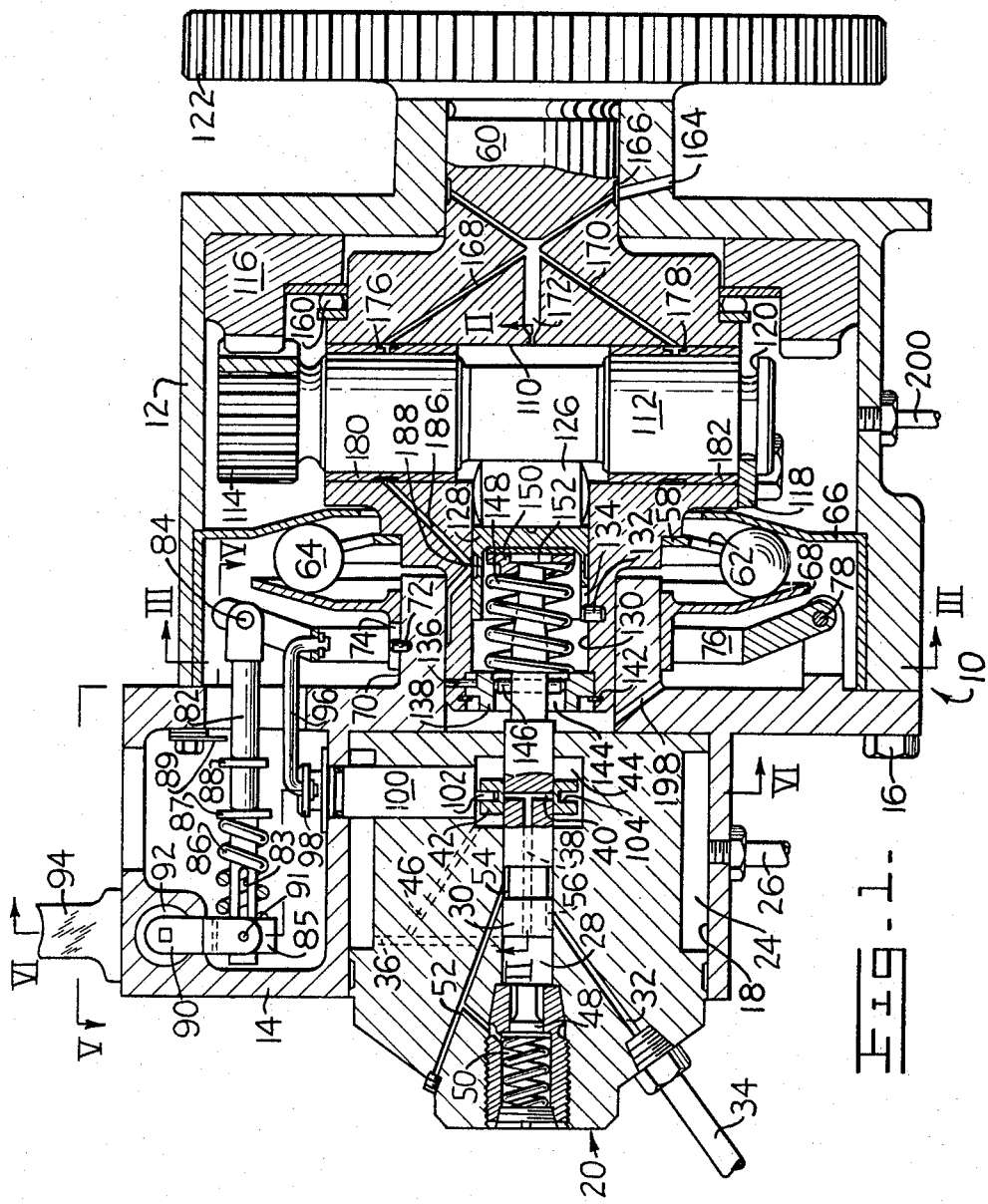
FIG. 1 is a longitudinal view, partially in section, of a fuel injection apparatus embodying the invention.

Referring now to FIG. 1 of the drawing, there is shown a two part housing 10 having the sections 12 and 14 thereof fastened together as by means of bolts 16. Section 14 of the housing is provided with a recess 18 which receives a pump head generally indicated at 20. The inside diameter of the recess 18 and an external annular groove 22 formed on the pump head define a fuel manifold 24 which comunicates with a fuel transfer pump (not shown) by means of a conduit 26. The pump head 20 is provided with a bore 28 which receives a plunger 30 for both reciprocal and rotational movement therein. The bore 28 is connected to a series of passages 32 (only one of which is shown), each of which is connected by a fuel line 34 to a fuel valve for each cylinder of the engine.

Fuel from the manifold 24 is free to flow through a fuel supply passage 36 into the bore 28 upstream of the plunger 30. The plunger 30 is provided with an axial passage 38 which intersects a radially drilled spill bore 40. An adjustable sleeve 42 is slidably received externally of the plunger 30 for controlling the opening and closing of the spill bore 40. The sleeve and spill bore are located in a spill chamber 44 which communicates with fluid passage 36 by means of a passage 46.

The quantity of fuel delivered on the injection stroke is determined by the relative position of sleeve 42 to spill bore 40 after passage 36 has been closed by axial movement of the plunger 30. During the pumping stroke of plunger 30, the spill bore 40 is covered by the collar 42 trapping the fuel therein. After the plunger passes passage 36 and while spill bore 40 is covered, the pressure in bore 28 increases and forces fuel from the bore to open a conventional spring loaded delivery valve 48 permitting fuel to flow into a chamber 50. The fuel then flows from the chamber 50 into a connecting passage 52 and subsequently into an annular groove 54 formed externally of the plunger 30. Fuel flows from the groove 54 to a distributing slot 56 which is adapted to communicate with each of the passages 32 in succession as the plunger 30 rotates.

As the spill bore 40 is opened to chamber 44, fuel is allowed to flow from the axial plunger passageway 38 into the chamber and out through passage 46. As a result, the pressure drops in bore 28 and the delivery valve 48 closes ending injection. Adjustment of sleeve 42 controls the quantity of fuel delivered to the fuel valves by varying the effective pumping stroke of the plunger 30. The delivery valve 48 maintains a prescribed residual pressure in the fuel delivery passages and the conduits between the pump and the injectors during the period between injections.

Figure 2:
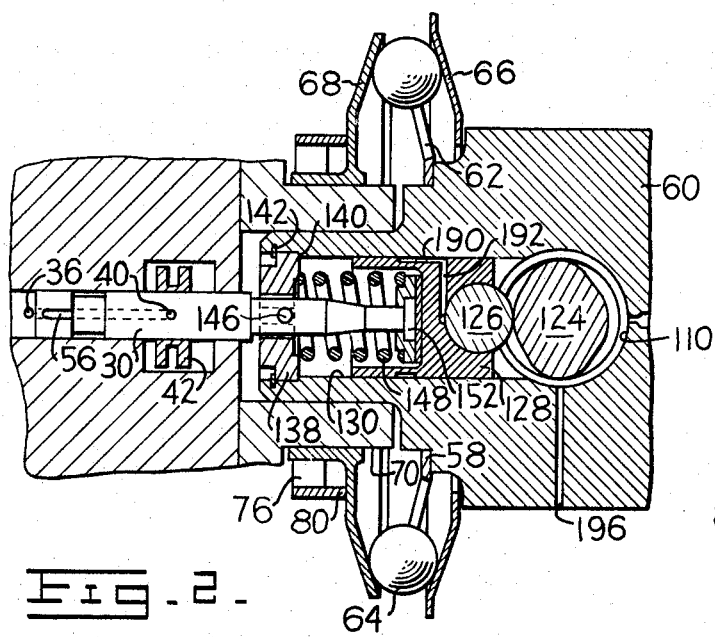
FIG. 2 is a sectional view taken on the line II—II of FIG. 1.

As shown in both FIGS. 1 and 2, a ball type governor is used to maintain engine speed. The governor comprises a carrier 58 secured to a drive shaft 60. The carrier 58 is provided with slots 62 which carry balls 64. The balls 64, being sensitive to centrifugal force as a result of their weight and speed of rotation around the drive shaft 60, react against a fixed ramp 66 which is secured to housing section 12 and a movable ramp 68 which is axially slidable on a diameter 70 of housing member 14 which is concentric with plunger 30. A pin 72 in member 14 engages a slot 74 of ramp 68 and prohibits the ramp from rotating about diameter 70. Such a novel centrifugal governing structure eliminates the need for thrust bearings normally associated therewith since the balls 64 also serve as thrust members.

Figure 3:
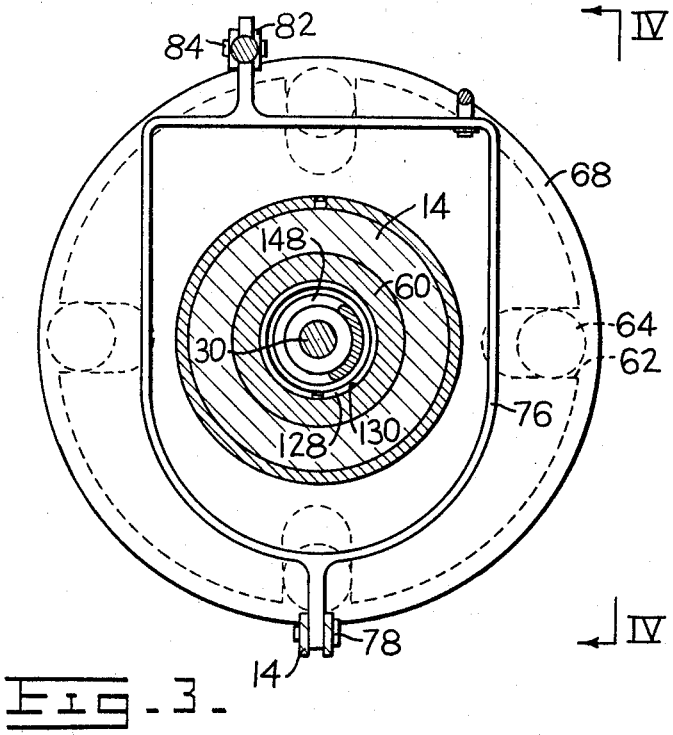
FIG. 3 is a sectional view taken on the line III—III of FIG. 1.
Figure 4:
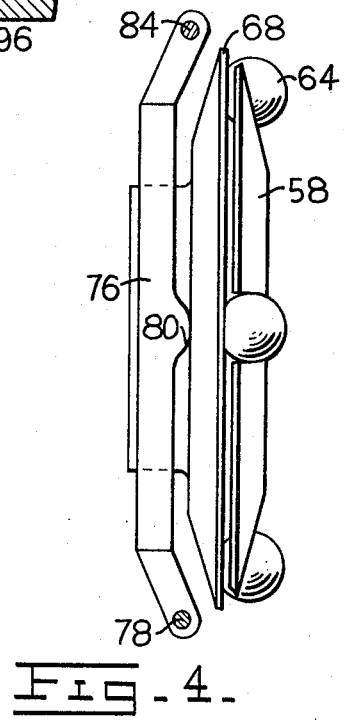
FIG. 4 is a side elevation taken at line IV—IV of FIG. 3.

As shown in FIGS. 1, 3 and 4, a yoke 76 is pivotally secured to housing member 14 at 78 and is adapted to engage ramp 68 by means of a cam surface 80 formed thereon. A rod 82 is pivotally mounted on the upper end of yoke 76 at a point 84. FIGS. 6 and 7, in conjunction with FIG. 1, more clearly show the other end of the rod or shaft 82 which is provided with a longitudinal slot 83 which slidably receives a pin 91 which extends across the bifurcated end of member 90 and has a plate 85 carried thereon. The plate 85 provides a retainer for one end of a spring 86, the other end of the spring engaging the raised annular shoulder 87 on rod 82. A second shoulder 88 is also formed on rod 82 for contacting the stop 89 formed on housing member 14. The pin 84 is pivotally mounted in bifurcated member 90 which in turn is secured at its upper end to a rotatable shaft 92 having a control lever 94.

It will be noted that a link 96 is also mounted on the top of yoke 76. The other end of link 96 is pivotally attached to a lever 98, which lever is fixedly secured on the upper end of a rotatable shaft 100 (FIGS. 1 and 6). The rotatable shaft 100 extends through both the body member 14 and the pump head 20 and is provided on its lower end with an eccentrically mounted pin 102 which engages an annular groove 104 formed in the collar 42.

In operation, the lever 94 is moved counterclockwise which also rotates bifurcated member 90 counterclockwise moving plate 85 to the right and compressing spring 86 against a shoulder 87 and subsequently causing yoke 76 to pivot in a clockwise direction against the ramp 68. Movement of the yoke 76 toward ramp 68 results in counterclockwise rotation of lever 98 and shaft 100 through the link connection 96. When the shaft 100 is rotated, the sleeve 42 moves axially along the plunger 30 due to the eccentric connection 102. The yoke 76 continues to move in a clockwise direction until the cam surface 80 engages the ramp 68. In this position, yoke 76 has caused sleeve 42 to be adjusted to allow for a maximum effective stroke which results in maximum injection of fuel per stroke of the plunger 30. The plate 85 will continue to compress spring 86 until the shoulder 88 of shaft 82 abuts against the stop 89. In this position, the governor is set to allow the engine to run at full load.

As engine speed continues to increase and the centrifugal force of the balls 64 overcomes the balancing force of the spring 86, ramp 68 will move yoke 76 in a counterclockwise direction. When this action occurs, link 96 causes lever 98 to move shaft 100 in a clockwise direction, thereby adjusting the sleeve 42 such that less fuel is injected and proper engine speed is maintained. The compression of the spring 86 will determine the speed of the engine by allowing the balls 64 to move ramp 68 until the force on the balls is equal to the force of the spring, thereby adjusting sleeve 42 to a position which maintains a prescribed speed established by the control lever 94.

In accordance with the invention, the driving and timing mechanism comprises a drive shaft 60 having a radial bore 110 extending therethrough for receiving a camshaft 112. The camshaft 112 has a spur gear 114 formed on one end which engages a stationary gear 116, preferably of the face or bevel type, which surrounds the drive shaft 60. Axial movement of the camshaft 112 in the bore 110 is prevented by the use of a thrust plate 118 which is bolted to the drive shaft 60 and engages a groove 120 formed in the camshaft 112. As the shaft 60 is rotated by drive gear 122, the camshaft 112 is forced to rotate about its own axis by the action of its spur gear 114 meshing with face gear 116. As best shown in FIG. 2, the camshaft is provided with one or more lobes 124 which, upon rotation of the camshaft, force a roller 126 against the lower surface of a lifter 128 which carries the plunger 30 for axial reciprocal motion.

The lifter 128 is carried in an axially extending bore 130 formed in one end of the shaft 60. The lifter 128 is allowed to reciprocate in an axial direction and is prohibited from rotational movement relative to shaft 60 by means of a pin 132 which engages a longitudinal slot 134 formed in the lifter. The plunger 30 is directly connected to the drive shaft 60 for rotational movement therewith in the following manner. A pin 136 secures a spring retainer 138 to the shaft 60 and causes the retainer to rotate in unison with the shaft. The spring retainer 138 is prohibited from axial movement within the bore by a shoulder 140 formed in the bore 130 and a snap ring 142. The retainer 138 is provided with a slotted portion 144 which slidably receives a pin 146 which is pressed into the plunger 30. This latter connection insures that the plunger 30 rotates with the retainer 138 and shaft 60 while still allowing the plunger to simultaneously reciprocate.

The retainer 138 also seats one end of a coil spring 148, the other end of which presses against a retainer 150 which is held upon the end of plunger 30 by means of a shoulder 152. The spring 148 insures that the plunger 30 will be returned to its fill position after the cam lobes 124 have moved out of engagement with roller 126. Thrust forces from the pumping load are imparted to the face gear 116 by a thrust bearing assembly 160 located between a shoulder formed on the shaft 60 and said gear.

It should be observed that the speed of the camshaft about its axis is determined by the ratios of the diameters of the spur gear 114 and the face gear 116. In the particular embodiment shown, shaft 60 turns at one-half engine speed and a 4:1 gear ratio causes the camshaft 112 to rotate at twice engine speed. Two cam lobes 124 are used for an eight cylinder, four cycle engine. It is to be understood that various engine configurations can be satisfied by varying the spur-face gear ratio and/or the number of lobes provided on the camshaft.

The drawings also disclose a means for lubricating the drive shaft, camshaft, and lifter assembly. Oil from a pump (not shown) enters a passage 164 and flows into an annular groove 166 formed on the shaft 60, from whence it enters passages 168, 170 and 172. The passage 172 has a small diameter orifice which communicates with the bore 110 and is used to provide coolant and lubrication for the camshaft 112, in the area of the cam lobes 124. Passages 168 and 170 direct oil into annular grooves 176 and 178 of camshaft bearings 180 and 182. Lubricant for the camshaft 112 is provided by small diameter ports formed in the bearing grooves 176 and 178. The annular groove 176 communicates with a passage 186 which leads to an annular groove 188 formed in the lifter 128. As best shown in FIG. 2, the lifter 128 is provided with a relief 190 on its outer surface connecting with a passage 192 that directs oil to the roller 126. The passage 186 also permits lubrication between shaft 60 and housing member 14. Oil drainage from bore 110 is provided by a passage 196 shown in FIG. 2 while drainage passages 198 and 200 (shown in FIG. 1) are provided to drain the housing.

FIG. 8 shows a modified embodiment of the pump drive mechanism whereby variable timing is achieved by changing the position of the face gear 116' with respect to the drive shaft 60' during operation of the engine. A spring biased actuating piston 204, controlled by some means sensitive to some desired engine variable such as engine speed or manifold pressure, moves a pin 206 in a slot 208 formed in the face gear 116'. Movement of the pin 206 causes the face gear 116' to rotate about the circumference of the drive shaft 60', thereby changing the angular relationship of the camshaft 112' with respect to the drive train of the engine.

I claim:

1. In a device of the character described, a housing; a rotatable drive shaft extending into said housing and having a first bore extending axially inward from one end thereof; said first bore receiving a combination pumping and distributing member; a second bore extending axially through said drive shaft and communicating with said first bore centrally of said drive shaft; said second bore receiving a camshaft for rotation therein; lobe means formed on said camshaft for selectively axially reciprocating said pumping and distributing member in said first bore; first circumferential gear means formed on one end of said camshaft; and, second normally stationary gear means outward of said drive shaft and concentric therewith for engaging said first gear means to cause rotation of said camshaft upon rotation of said drive shaft.

2. A device as described in claim 1 wherein actuating means are provided for selectively rotating said second gear means during operation of said device to vary the reciprocating cycle of said pumping and distributing member.

3. Apparatus as set forth in claim 1 having in combination therewith a centrifugal governor comprising a rotatable carrier secured near said one end of said drive shaft and having a plurality of spaced radially extending circumferential slots; each of said slots receiving a spherical ball for radial movement therein; said balls normally in contact with a pair of ramp members which cooperate to define an expansible cage thereabout; one of said ramp members being fixed and the other of said ramp members being movable axially of said carrier but fixed against rotational movement therewith.

References Cited

UNITED STATES PATENTS

| 141,480 | 8/1873 | Archer | 74—22 |
| 2,465,784 | 3/1949 | Berlyn | 123—140 |
| 3,091,231 | 5/1963 | Giraudon | 123—139.13 |

DONLEY J. STOCKING, *Primary Examiner.*

L. V. EFNER, *Examiner.*

UNITED STATES PATENT OFFICE
CERTIFICATE OF CORRECTION

Patent No. 3,381,615                          May 7, 1968

John M. Bailey

It is certified that error appears in the above identified patent and that said Letters Patent are hereby corrected as shown below:

Column 4, line 61, "axially" should read -- radially --.

Signed and sealed this 4th day of November 1969.

(SEAL)
Attest:

Edward M. Fletcher, Jr.                        WILLIAM E. SCHUYLER, JR.

Attesting Officer                                   Commissioner of Patents